| (12) | United States Patent | (10) Patent No.: | US 11,290,191 B2 |
|---|---|---|---|
| | Graceffo et al. | (45) Date of Patent: | Mar. 29, 2022 |

(54) METHODS AND APPARATUS FOR TRACKING MOVING OBJECTS USING SYMMETRIC PHASE CHANGE DETECTION

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/853,107

(22) Filed: Apr. 20, 2020

(65) Prior Publication Data

US 2020/0403709 A1 Dec. 24, 2020

Related U.S. Application Data

(60) Provisional application No. 62/864,090, filed on Jun. 20, 2019.

(51) Int. Cl.
*H04B 10/06* (2006.01)
*H04B 10/61* (2013.01)
(Continued)

(52) U.S. Cl.
CPC ....... *H04B 10/616* (2013.01); *H04B 10/5561* (2013.01); *H01S 3/10076* (2013.01); *H01S 3/1307* (2013.01); *H04B 2210/516* (2013.01)

(58) Field of Classification Search
CPC .................................................. H04B 10/616
See application file for complete search history.

(56) References Cited

U.S. PATENT DOCUMENTS

| 4,172,663 A | 10/1979 | Byer et al. |
| 4,417,964 A | 11/1983 | Wolfrum et al. |
| | (Continued) | |

FOREIGN PATENT DOCUMENTS

| EP | 0426357 A2 | 5/1991 |
| JP | H06265832 A | 9/1994 |
| | (Continued) | |

OTHER PUBLICATIONS

US 11,112,675 B1, 09/2021, Kowalevicz et al. (withdrawn)
(Continued)

*Primary Examiner* — David G Payne
*Assistant Examiner* — Pranesh K Barua
(74) *Attorney, Agent, or Firm* — Lando & Anastasi, LLP

(57) ABSTRACT

An optical receiver including an optical resonator and a steering mechanism coupled to the at least one optical resonator is disclosed. The optical resonator is configured to receive a phase modulated input optical signal and to produce an intensity modulated output optical signal. An intensity modulation of the output optical signal is representative of the phase modulation of the input optical signal. The optical receiver further comprises an optical-electrical converter that detects the intensity modulated output optical signal and converts the intensity modulated output optical signal to an electrical signal, and signal processor that receives the electrical signal, performs symmetric phase change measurements based on the electrical signal, and provides a control signal to actuate the steering mechanism to steer the optical resonator to maintain normal incidence of the phase modulated input optical signal on a surface of at least one optical resonator.

18 Claims, 4 Drawing Sheets

(51) Int. Cl.
   *H04B 10/556*   (2013.01)
   *H01S 3/10*     (2006.01)
   *H01S 3/13*     (2006.01)

(56) References Cited

U.S. PATENT DOCUMENTS

| | | | |
|---|---|---|---|
| 4,980,892 A | 12/1990 | Cunningham et al. | |
| 5,777,768 A | 7/1998 | Korevaar | |
| 5,896,005 A | 4/1999 | Gurvitch et al. | |
| 5,912,748 A | 6/1999 | Wu et al. | |
| 6,466,707 B1 | 10/2002 | Dawes et al. | |
| 6,816,315 B1 | 11/2004 | Ai et al. | |
| 6,868,237 B2 | 3/2005 | Willebrand et al. | |
| 6,882,764 B1 | 4/2005 | Deng et al. | |
| 7,039,278 B1 | 5/2006 | Huang et al. | |
| 7,158,281 B2 | 1/2007 | Chen et al. | |
| 7,361,884 B2 | 4/2008 | Tanaka et al. | |
| 7,711,441 B2 * | 5/2010 | Tillotson | B60L 8/00 700/59 |
| 7,907,648 B2 | 3/2011 | Matsui et al. | |
| 8,427,649 B2 | 4/2013 | Hays et al. | |
| 8,929,408 B1 | 1/2015 | Diels et al. | |
| 9,018,575 B2 | 4/2015 | Kowalevicz et al. | |
| 9,091,853 B2 | 7/2015 | Longeaud | |
| 9,165,963 B2 | 10/2015 | Kowalevicz et al. | |
| 9,171,219 B2 | 10/2015 | Kowalevicz | |
| 9,323,034 B2 | 4/2016 | Dolgin | |
| 9,400,414 B2 | 7/2016 | Kowalevicz | |
| 9,451,185 B2 | 9/2016 | Dolgin et al. | |
| 9,503,660 B2 | 11/2016 | Kowalevicz et al. | |
| 9,535,245 B1 | 1/2017 | Kowalevicz | |
| 9,538,096 B2 | 1/2017 | Dolgin | |
| 9,887,779 B2 | 2/2018 | Kowalevicz | |
| 9,973,281 B2 | 5/2018 | Kowalevicz et al. | |
| 9,989,700 B1 | 6/2018 | Ayliffe et al. | |
| 10,164,765 B2 | 12/2018 | Dolgin et al. | |
| 10,177,856 B2 | 1/2019 | Kowalevicz et al. | |
| 10,205,526 B2 | 2/2019 | Kowalevicz | |
| 10,225,020 B2 | 3/2019 | Dolgin et al. | |
| 10,243,670 B2 | 3/2019 | Kowalevicz et al. | |
| 10,243,673 B2 | 3/2019 | Dolgin et al. | |
| 10,250,292 B2 | 4/2019 | Graceffo et al. | |
| 10,256,917 B2 | 4/2019 | Dolgin et al. | |
| 10,305,602 B2 | 5/2019 | Dolgin et al. | |
| 10,313,022 B2 | 6/2019 | Dolgin et al. | |
| 10,340,965 B2 | 7/2019 | Dolgin et al. | |
| 10,374,743 B2 | 8/2019 | Dolgin et al. | |
| 10,378,880 B2 | 8/2019 | Dolgin et al. | |
| 10,432,315 B2 | 10/2019 | Chen et al. | |
| 10,498,464 B2 | 12/2019 | Graceffo et al. | |
| 10,530,494 B2 | 1/2020 | Dolgin et al. | |
| 10,554,306 B1 | 2/2020 | Graceffo et al. | |
| 10,571,774 B2 | 2/2020 | Graceffo et al. | |
| 10,637,580 B2 | 4/2020 | Dolgin et al. | |
| 10,686,533 B2 | 6/2020 | Dolgin et al. | |
| 10,714,251 B2 | 7/2020 | Dolgin et al. | |
| 10,826,603 B1 | 11/2020 | Kowalevicz et al. | |
| 10,924,189 B2 | 2/2021 | Kowalevicz et al. | |
| 11,012,160 B2 | 5/2021 | Kowalevicz et al. | |
| 11,101,896 B2 | 8/2021 | Kowalevicz et al. | |
| 11,133,873 B1 | 9/2021 | Kowalevicz et al. | |
| 2002/0030439 A1 | 3/2002 | Gurvitch et al. | |
| 2002/0122614 A1 | 9/2002 | Zhou et al. | |
| 2002/0171908 A1 | 11/2002 | Copner et al. | |
| 2004/0013437 A1 | 1/2004 | Wiltsey et al. | |
| 2004/0080832 A1 | 4/2004 | Singh | |
| 2004/0080834 A1 | 4/2004 | Thompson | |
| 2005/0014472 A1 | 1/2005 | Cox et al. | |
| 2006/0140548 A1 | 6/2006 | Shin et al. | |
| 2006/0159135 A1 | 7/2006 | Cliche et al. | |
| 2006/0182154 A1 | 8/2006 | Tanaka et al. | |
| 2006/0262396 A1 | 11/2006 | Smith | |
| 2007/0076282 A1 | 4/2007 | Kourogi et al. | |
| 2007/0171504 A1 | 7/2007 | Fujimori | |
| 2009/0210191 A1 * | 8/2009 | Rogers | G01J 5/0862 702/134 |
| 2010/0135670 A1 * | 6/2010 | Amadeo | H04B 10/1123 398/158 |
| 2010/0253948 A1 | 10/2010 | Strandjord et al. | |
| 2011/0242290 A1 | 10/2011 | Arai | |
| 2011/0273758 A1 | 11/2011 | Wang et al. | |
| 2012/0147361 A1 | 6/2012 | Mochizuki et al. | |
| 2012/0154542 A1 | 6/2012 | Katz et al. | |
| 2013/0099140 A1 | 4/2013 | Nakarai et al. | |
| 2013/0126755 A1 | 5/2013 | Kemnitz | |
| 2013/0278933 A1 | 10/2013 | Nozawa | |
| 2014/0240711 A1 | 8/2014 | Matsushita | |
| 2014/0314406 A1 | 10/2014 | Zerbe et al. | |
| 2016/0043794 A1 | 2/2016 | Ashrafi et al. | |
| 2016/0047987 A1 | 2/2016 | Du et al. | |
| 2016/0064894 A1 | 3/2016 | Takiguchi et al. | |
| 2016/0209643 A1 | 7/2016 | Tsikouras et al. | |
| 2016/0259185 A1 | 9/2016 | Osumi et al. | |
| 2016/0349284 A1 | 12/2016 | Pradhan et al. | |
| 2016/0357189 A1 * | 12/2016 | Barrows | G05D 1/0246 |
| 2016/0363648 A1 * | 12/2016 | Mindell | G01S 13/74 |
| 2017/0299882 A1 | 10/2017 | New et al. | |
| 2018/0019807 A1 | 1/2018 | Hreha et al. | |
| 2018/0054259 A1 | 2/2018 | Kowalevicz et al. | |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |
| 2018/0091232 A1 | 3/2018 | Dolgin et al. | |
| 2018/0102853 A1 * | 4/2018 | Dolgin | G02F 2/00 |
| 2018/0145764 A1 * | 5/2018 | Dolgin | G02B 6/29338 |
| 2018/0145765 A1 | 5/2018 | Kowalevicz et al. | |
| 2018/0167145 A1 | 6/2018 | Dolgin et al. | |
| 2018/0212682 A1 | 7/2018 | Chen et al. | |
| 2018/0234231 A1 | 8/2018 | Dolgin et al. | |
| 2018/0275050 A1 | 9/2018 | Iguchi et al. | |
| 2018/0367223 A1 | 12/2018 | Graceffo et al. | |
| 2019/0007091 A1 | 1/2019 | Graceffo et al. | |
| 2019/0064629 A1 | 2/2019 | Abouraddy et al. | |
| 2019/0158208 A1 | 5/2019 | Dolgin et al. | |
| 2019/0208183 A1 | 7/2019 | Schmidt et al. | |
| 2019/0257990 A1 | 8/2019 | Hunter et al. | |
| 2019/0295264 A1 | 9/2019 | Petilli | |
| 2019/0305853 A1 | 10/2019 | Dolgin et al. | |
| 2019/0319714 A1 | 10/2019 | Kowalevicz et al. | |
| 2019/0331941 A1 | 10/2019 | Coolbaugh et al. | |
| 2020/0096504 A1 | 3/2020 | Kawata et al. | |
| 2020/0136727 A1 | 4/2020 | Graceffo et al. | |
| 2020/0278272 A1 | 9/2020 | Kasahara et al. | |
| 2020/0371328 A1 | 11/2020 | Kowalevicz et al. | |
| 2020/0403709 A1 | 12/2020 | Graceffo et al. | |
| 2020/0409189 A1 | 12/2020 | Graceffo et al. | |
| 2021/0006336 A1 | 1/2021 | Kowalevicz et al. | |
| 2021/0021449 A1 | 1/2021 | Graceffo et al. | |
| 2021/0021775 A1 | 1/2021 | Lee | |
| 2021/0041515 A1 | 2/2021 | Dolgin | |
| 2021/0099232 A1 | 4/2021 | Graceffo et al. | |
| 2021/0099234 A1 | 4/2021 | Graceffo et al. | |
| 2021/0105073 A1 | 4/2021 | Graceffo et al. | |
| 2021/0126715 A1 | 4/2021 | Graceffo et al. | |

FOREIGN PATENT DOCUMENTS

| | | |
|---|---|---|
| WO | 8500484 A1 | 1/1985 |
| WO | 2007016537 A2 | 2/2007 |

OTHER PUBLICATIONS

International Search Report and Written Opinion of International Patent Application No. PCT/US2020/028941 dated Sep. 23, 2020.
International Search Report and Written Opinion of International Patent Application No. PCT/US2020/040751 dated Oct. 19, 2020.
Invitation to Pay Additional Fees from the International Searching Authority in International Patent Application No. PCT/US2020/042160 dated Oct. 16, 2020.
International Search Report and Written Opinion in International Patent Application No. PCT/US2020/042160 dated Dec. 7, 2020.

(56) References Cited

OTHER PUBLICATIONS

Ball, D.W., "Field Guide to Spectroscopy," SPIE Press, Bellingham, WA (2006), https://spie.org/publications/fg08_p13_i ndex_of_ refraction?SSO= 1.

* cited by examiner

METHODS AND APPARATUS FOR TRACKING MOVING OBJECTS USING SYMMETRIC PHASE CHANGE DETECTION

CROSS-REFERENCE TO RELATED APPLICATION

This application claims priority under 35 U.S.C. § 119(e) to U.S. Provisional Application Ser. No. 62/864,090, titled "METHODS AND APPARATUS FOR TRACKING MOVING OBJECTS USING SYMMETRIC PHASE CHANGE DETECTION," filed on Jun. 20, 2019, which is hereby incorporated by reference in its entirety.

BACKGROUND

Many optical communication systems manipulate light waves to carry information. For instance, often a light source (e.g., a laser source) is modulated to change various properties of emitted light, such as an amplitude, phase, or frequency of the light to convey information. An optical receiver may receive and demodulate the light waves to recover the information. For free space optical communications, when communicating with a moving object such as an aircraft or a satellite, the optical receiver may need to spatially track the incoming signal to maintain the communications link.

SUMMARY OF THE INVENTION

Aspects and embodiments are directed to optical receivers using an optical resonator assembly for signal demodulation, and to methods and apparatus for tracking a moving signal source transmitting a phase modulated optical signal.

According to one embodiment an optical receiver comprises an optical resonator assembly including at least one optical resonator and a steering mechanism coupled to the at least one optical resonator, the at least one optical resonator being configured to receive a phase modulated input optical signal, to accumulate optical signal energy inside the at least one optical resonator based at least in part on the phase modulated input optical signal, and to produce an intensity modulated output optical signal, an intensity modulation of the output optical signal being representative of the phase modulation of the input optical signal, the at least one optical resonator being tuned to exhibit a symmetric phase change condition in the output optical signal at normal incidence of the phase modulated input optical signal on a surface of the at least one optical resonator. The optical receiver further comprises an optical-electrical converter configured to detect the intensity modulated output optical signal and to convert the intensity modulated output optical signal into an electrical signal, and signal processing and control circuitry coupled to the optical resonator assembly and to the optical-electrical converter, the signal processing and control circuitry being configured to receive the electrical signal, to perform symmetric phase change measurements based on the electrical signal, and to provide a control signal based on the symmetric phase change measurements to actuate the steering mechanism to steer the at least one optical resonator to maintain normal incidence of the phase modulated input optical signal on the surface of at least one optical resonator.

In one example, the at least one optical resonator is a Fabry-Perot etalon.

In another example, the at least one optical resonator includes a first semi-reflective surface positioned to receive the phase modulated input optical signal, and a second semi-reflective surface positioned facing the first semi-reflective surface, wherein the at least one optical resonator is configured to accumulate the optical signal energy inside the at least one optical resonator and between the first semi-reflective surface and the second semi-reflective surface to approach a steady-state output value of the output optical signal, the intensity modulation of the output optical signal including a series of deviations from the steady-state output value.

In one example, in performing the symmetric phase change measurements, the signal processing and control circuitry is configured to compare a first amplitude of the intensity modulated output optical signal in response to a positive phase rotation in the phase modulated input optical signal to a second amplitude of the intensity modulated output optical signal in response to a negative phase rotation of a same magnitude in the phase modulated input optical signal. In one example, the signal processing and control circuitry includes a Kalman filter configured to filter the symmetric phase change measurements. In another example, the signal processing and control circuitry includes a position estimator configured to, based on the symmetric phase change measurements, to produce an estimate of an orientation, in x, y, and z coordinates, of the at least one optical resonator to maintain normal incidence of the phase modulated input optical signal on the surface of at least one optical resonator, the control signal being based on the estimate of the orientation. In another example, the signal processing and control circuitry is further configured to compute directional cosine vectors in a direction of a source of the phase modulated input optical signal based on the orientation of the at least one optical resonator.

In one example, the steering mechanism is a piezoelectric device.

According to another embodiment, a method of tracking a moving transmitter using an optical receiver comprises receiving a phase modulated input optical signal from the transmitter at an optical resonator included in the optical receiver, emitting an intensity modulated output optical signal from the optical resonator, an intensity modulation of the intensity modulated output optical signal being representative of a phase modulation of the phase modulated input optical signal, measuring a response of the optical resonator to positive and negative phase rotations of equal magnitude in the phase modulated input optical signal, and based on the measured response, steering an orientation of the optical resonator to maintain normal incidence of the phase modulated input optical signal on a surface of the optical resonator.

In one example, measuring the response of the optical resonator includes measuring an amplitude of the intensity modulated output optical signal in response to +Pi and −Pi phase rotations in the phase modulated input optical signal.

The method may further comprise filtering measurements of the response of the optical resonator using a Kalman filter to produce filtered measurements. In one example, the method further comprises, based on the filtered measurements, computing an estimate of the orientation of the optical resonator needed to maintain the normal incidence of the phase modulated input optical signal, and wherein steering the orientation of the optical resonator is based on the estimate. In another example, steering the orientation of the optical resonator includes actuating a piezoelectric steering mechanism coupled to the optical resonator.

The method may further comprise based on the orientation of the optical resonator, computing directional cosine vectors in a direction of the transmitter, and determining a bearing to the transmitter from the optical receiver based on the directional cosine vectors. In one example, the phase modulated input optical signal includes a time-dependent coding signal, and the method further comprises estimating a distance between the optical receiver and the transmitter based on the time-dependent coding signal. The method may further comprise estimating a location of the transmitter based on the directional cosine vectors and the estimated distance between the optical receiver and the transmitter. In another example, the method further comprises determining a Doppler shift of the phase modulated input optical signal received at the optical resonator based on a frequency of the phase modulated input optical signal, the orientation of the optical resonator, and a thickness of the optical resonator. In another example, the method further comprises determining an instantaneous velocity of the transmitter based on the Doppler shift.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 3:
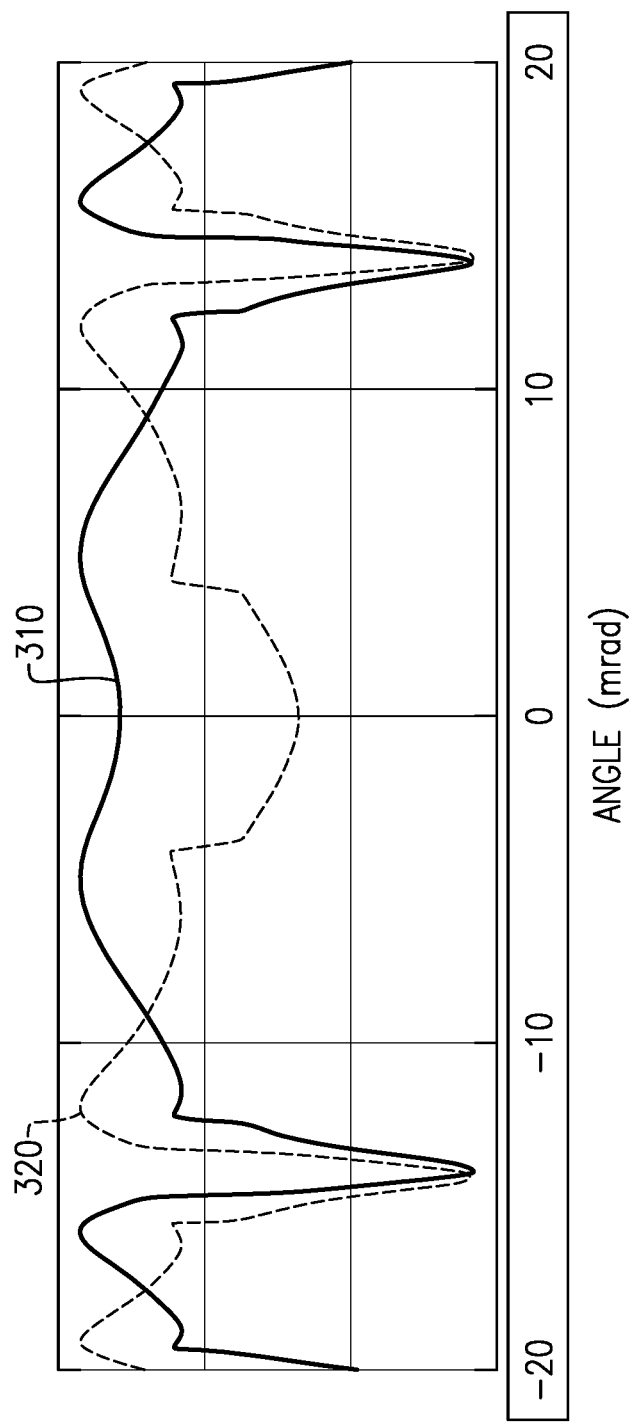
FIG. 3 is graph illustrating an example the symmetric phase change condition in the intensity profile of an output optical signal from an etalon according to aspects of the present invention.

Certain optical signal receivers include an optical resonator assembly, such as a Fabry-Perot resonator assembly or other bulk free-space optical cavity/resonator generally referred to herein as an "etalon," that is used to demodulate arriving optical signals. In certain examples, the optical resonator assembly converts a received phase, amplitude, or frequency modulated optical signal into a directly detectable intensity modulated output signal, as discussed further below. The arriving optical signals may be phase modulated, amplitude modulated, or frequency modulated, or may be modulated using a combination of these techniques (e.g., QAM methods). For phase modulated optical signals, an etalon can be configured to distinguish the direction of a phase change as well as the magnitude of the phase change. For example, the etalon can be configured to distinguish between a +Pi phase change and a −Pi phase change in the arriving phase modulated optical signal. Further, the optical resonator assembly may be sensitive to the angle of arrival of the incoming optical signal, and its output response signal may change as a function of that angle. According to certain aspects, it has been discovered that the depth of the signal following a phase change varies with the angle of arrival of the incoming signal. These phenomena are discussed further below with reference to FIG. 3. In FIG. 3, the horizontal axis is the angle of incidence, relative to a surface normal vector. That is, zero mrads is orthogonal to the etalon surface. The vertical axis is the peak amplitude. The trace 310 represents a +pi change and the trace 320 represents a −pi change. It is observed that at normal incidence, the magnitude of the +pi and −pi phase changes are the same, although they differ in direction. This phenomenon is referred to as Symmetric Phase Change (SPC). By detecting the SPC condition, one can ensure that the incoming signal is normal to the surface of the etalon.

As discussed above, when communicating with a moving object such as an aircraft or a satellite, the optical receiver may need to spatially track the incoming signal to maintain the communications link. Accordingly, aspects and examples described herein leverage the angular sensitivity of the etalon and its ability to distinguish positive and negative phase rotations in the arriving phase modulated optical signal and to determine that the arriving signal is normal to the etalon surface based on the output response to +pi and −pi phase changes having the same magnitude to provide a method by which to track a moving source of the arriving optical signal.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

Figure 1:
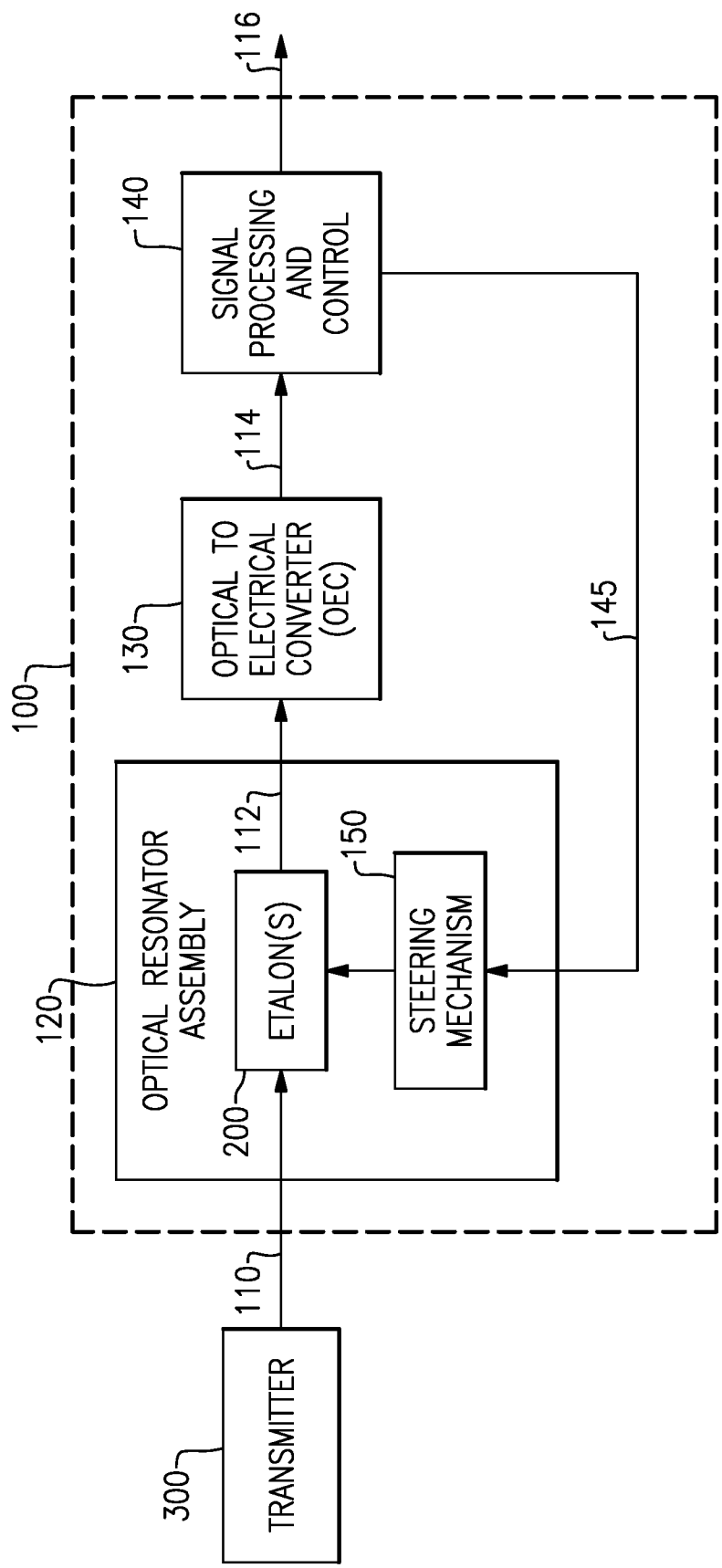
FIG. 1 is a functional block diagram of one example of an optical receiver according to certain aspects of the present invention.

FIG. 1 is a block diagram of one example of an optical communications system including an optical receiver 100 and a transmitter 300 according to certain embodiments. The optical receiver 100 receives a modulated optical signal 110 transmitted along a free space signal path from the transmitter 300. As noted above, in certain examples, the modulated optical signal 110 is phase modulated. The optical receiver 100 includes an optical resonator assembly 120 that includes one or more optical cavity resonators 200 configured to convert the modulation of the modulated optical signal 110 into intensity modulation of an output optical signal 112. As used herein, the term "optical resonator" refers to a component capable of converting variations, such as frequency variations, or phase variations in the received optical signal 110, to amplitude variations. Examples of optical resonators may include Fabry-Perot etalons or other types of optical cavity resonators. The optical receiver 100 further includes at least one optical-electrical converter (OEC) 130, along with signal processing and control circuitry 140. In certain examples, the OEC 130 and the signal processing and control circuitry 140 may be collectively referred to as a detector. The optical resonator assembly 120 is positioned to receive the modulated optical signal 110 and to produce the output optical signal 112 that has characteristics representative of the modulation of the modulated optical signal 110, as discussed further below. The OEC 130 receives the output optical signal 112 from the optical resonator assembly 120 and converts the optical signal 112 into an electrical signal 114 that can be processed by the signal processing and control circuitry 140 to produce a decoded information signal 116. The decoded information signal 116 may include the information that was encoded on the modulated optical signal 110 by the modulation of the modulated optical signal 110. The OEC 130 may include one or more photodiodes, for example, or other components capable of transforming an optical signal into an electrical signal. The signal processing and control circuitry 140 may include various components, as will be understood by those skilled in the art, such as analog-to-digital converters, filters, amplifiers, controllers, processors, etc., to condition and process the electrical signals received from the OEC 130 to produce the decoded information signal 116.

Operation of an optical resonator as a phase change detector is discussed below using the example of an etalon; however, those skilled in the art will appreciate that other types of optical resonators can be operated according to similar principles.

Figure 2:
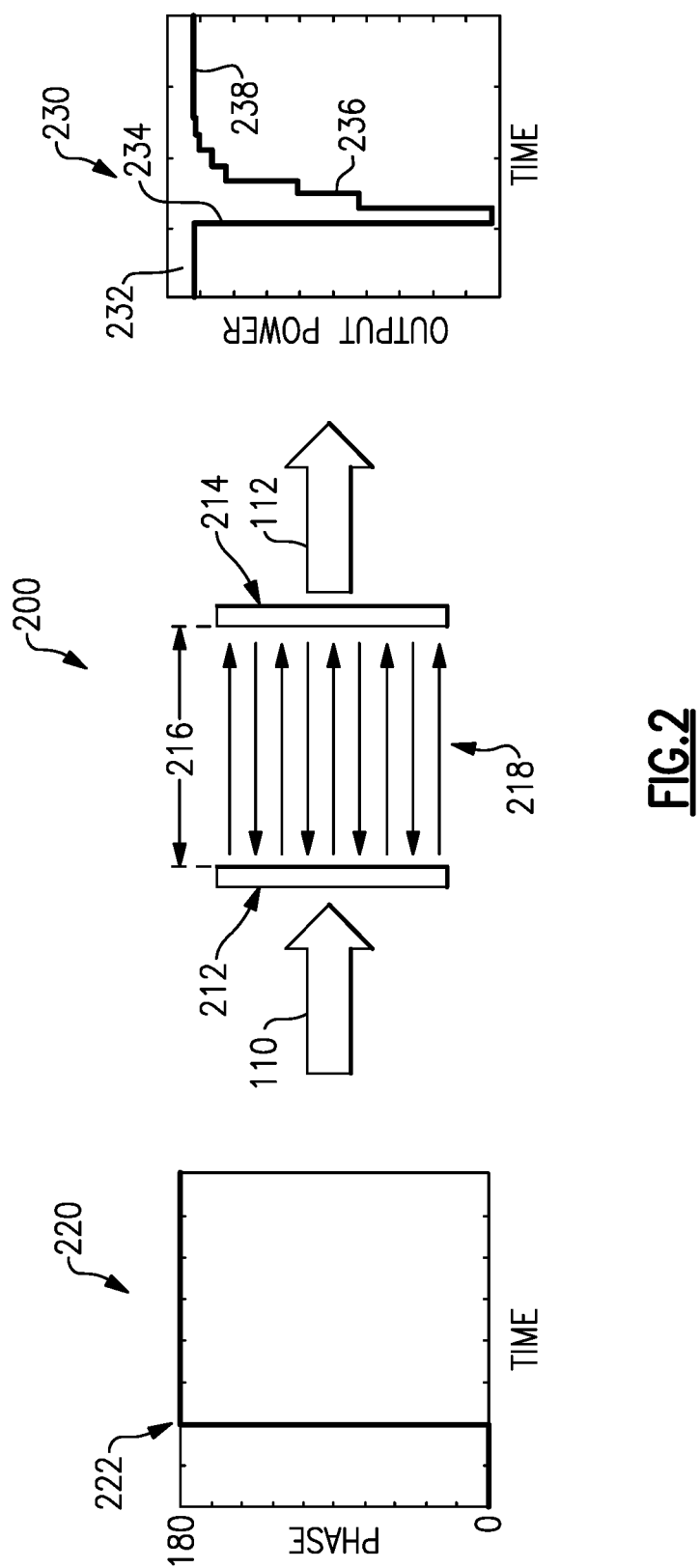
FIG. 2 is a diagram illustrating an example of operation of an etalon according to aspects of the present invention.

Referring to FIG. 2, in certain examples an etalon 200 is a component having a pair of parallel semi-reflective surfaces 212, 214 that may include an optically transparent material in between, and has a characteristic resonant frequency associated with a certain wavelength of light based upon the spacing (i.e., dimension 216) between the semi-reflective surfaces. The surfaces 212, 214 are semi-reflective and also semi-transmissive, in that they allow some light through, and therefore the arriving modulated optical signal 110 may be allowed into the etalon 200 and may resonate inside the etalon (i.e., in the interior 218 between the two semi-reflective surfaces 212, 214). Additionally, some of the light resonating inside is allowed out of the etalon 200 (through at least one of the semi-transmissive surfaces). Light emerging from the etalon 200 is shown, for example, as the output optical signal 112.

The optical signal 110 received by the etalon 200 establishes a steady-state condition in which optical signal energy continuously arrives at the etalon 200, adds to the built-up resonating energy existing inside the etalon 200, and emerges from the etalon 200 at a constant rate. If the frequency, amplitude, or phase of the arriving optical signal 110 changes, this change causes a temporary disruption to the resonance inside the etalon 200 and the light intensity emerging from the etalon 200 is also disrupted, until a steady state condition is re-established. Accordingly, a change in phase, frequency, or amplitude of the arriving optical signal 110 causes a change in intensity of the output optical signal 112. Thus, the etalon functions as a modulation converter, for the optical signal 110. The output optical signal 112 may therefore carry the same information content as the arriving optical signal 110, but in an intensity modulated form, rather than a phase modulated form, for example.

FIG. 2 illustrates an example of the above-described operation of the etalon 200. FIG. 2 shows a graph 220 of the arriving modulated optical signal 110, showing a phase change in the optical signal 110. The graph 220 plots the phase (vertical axis) of the optical signal 110 over time (horizontal axis), showing a phase transition of pi (180 degrees) at point 222. FIG. 2 also shows a graph 230 of optical signal intensity (as output power) emerging from the etalon 200 during the phase transition in the received optical signal 110. At region 232 the etalon 200 is in a steady-state resonance condition wherein a steady intensity of light emerges. At point 234, corresponding to point 222 in the graph 220, a phase transition occurs in the arriving optical signal 110, temporarily disrupting the steady-state and causing a drop in the emerging light intensity. During successive reflections inside the etalon 200, and indicated region 236 in the graph 230, resonance is re-establishing, and the emerging light intensity increases until, at point 238, a steady intensity of light emerges when the etalon 200 has returned to a steady-state condition. Thus, variations in the intensity of the output optical signal 112 from the etalon 200 indicate that a transition occurred in the arriving optical signal 110, such as a phase transition due to phase modulation of the optical signal 110.

The etalon 200 may have varying levels of reflectivity of the semi-reflective surfaces 212, 214. In certain examples, the reflectivity may be expressed as a fraction of light amplitude reflected back into the interior 216 or may be expressed as a fraction of light intensity reflected back into the interior 216. The reflectivity of each of the first and second semi-reflective surfaces 212, 214 may be the same or different, and may be any suitable value for a particular implementation. The etalon 200 is one example of a suitable optical resonator in accord with aspects and embodiments described herein. However, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples. In the example shown in FIG. 2, the output intensity/power from the etalon 200 exhibits a transient disturbance that is a temporary reduction in power; however, in other configurations the transient disturbance may instead be a temporary increase in response to a phase (or amplitude or frequency) transition occurring in the arriving modulated optical signal 110.

As discussed above, the optical resonator assembly 120 may include one or more etalons 200, or other types of optical resonators that operate similarly to convert the modulation of the arriving optical signal 110 into the intensity-modulated output optical signal 112 which may then be detected and processed to recover the information encoded in the original optical signal 110. The etalon(s) 200 may also be used to track the transmitter 300 as it or the optical receiver 100 moves. According to certain aspects, tracking the moving transmitter 300 can be accomplished by maintaining the incoming optical signal 110 normal to and centered on the surface 212 of the etalon 200. The output response 112 of the etalon 200 is sensitive to, and varies with, the angle of incidence of the arriving optical signal 110. In particular, the response of the etalon 200 to a given phase change in the input optical signal 110 is different depending on whether the input optical signal 110 arrives at normal incidence or some angle relative to normal. Therefore, by monitoring the output optical signal 112 (or its electrical counterpart 114), and adjusting the position of the etalon 200, normal incidence can be maintained, thereby ensuring that the etalon 200, and thus the optical receiver 100, track and maintain alignment with the transmitter 300.

According to certain embodiments, the etalon 200 can be configured such that the difference between +Pi and −Pi phase changes in the input optical signal 110 can be identified. The intensity profile of the output optical signal 112 from the etalon 200 varies with the angle of incidence of the arriving optical signal 110 and with the magnitude and direction of the phase change in the arriving optical signal 110. These phenomena are illustrated in FIG. 3. For a given magnitude of phase change (e.g., Pi radians), the intensity profile of the output optical signal 112 can indicate whether the direction of the phase change was positive or negative. Similarly, for a phase change of a given direction and magnitude, the intensity profile of the output optical signal 112 can provide information about the angle of arrival of the input optical signal 110, and therefore the location of the transmitter 300 relative to the optical receiver 100. In particular, as discussed above, according to certain embodiments, the difference in the output optical signal 112 to positive and negative phase changes is used to determine the angle of arrival of the input optical signal 110 at the etalon 200. Specifically, as discussed above, this difference is greatest when the angle of arrival is zero mrads, or normal to the surface of the etalon 200. Thus, detecting this maximum difference, or detecting the so-called symmetric phase condition, allows determination that the arriving optical signal 110 is normal to the surface of the etalon 200.

Referring to FIG. 3, the horizontal axis of the graph is the angle of incidence of the arriving optical signal 110 at the etalon 200, relative to a surface normal vector. That is, an angle of zero milliradians (mrads) is orthogonal to the etalon surface. The vertical axis is the peak amplitude of the output optical signal 112. The graph shown in FIG. 3 corresponds to an example of the etalon 200 having a thickness (dimension 216) of 10 millimeters (mm) and an operating point that is detuned from resonance by 0.125. In FIG. 3, the solid line trace 310 represents a +Pi phase change in the arriving optical signal 110 and the dotted line trace 320 represents a −Pi phase change. As shown, in this example, the etalon 200 is tuned such that at normal incidence of the arriving optical signal 110, the magnitude of the +Pi and −Pi phase changes are the same, although they differ in direction. This phenomenon is referred to as symmetric phase change (SPC). By detecting the symmetric phase change condition, it can be ensured that the incoming optical signal 110 is normal to the surface of the etalon 200.

According to certain embodiments, the etalon 200 is set up and tuned to an operating point where the etalon 200 produces the output optical signal 112 exhibiting the symmetric phase change condition at normal incidence of the arriving optical signal 110. This can be achieved by selecting (or tuning) the dimension 216 of the etalon 200 based on a known wavelength/frequency of the input optical signal 110. Examples of tuning the optical path length of the etalon 200 to a particular operating point and the relationship between the optical thickness of the etalon and its operating point (resonance condition or detuning from resonance) are discussed, for example, in U.S. Provisional Application No. 62/835,672 titled "METHODS AND APPARATUS FOR MAINTAINING RECEIVER OPERATING POINT WITH CHANGING ANGLE-OF-ARRIVAL OF A RECEIVED SIGNAL," which is herein incorporated by reference in its entirety for all purposes. Once the etalon 200 is tuned for the desired response given particular conditions, deviations from that response can indicate a change in the conditions. For example, due to the angular sensitivity of the etalon 200, a change in the intensity profile of the output optical signal 112 can indicate a change in the angle of arrival of the input optical signal 110. The etalon 200 may be adjusted, e.g., rotated, to maintain normal incidence, for example.

Thus, according to certain embodiments, the etalon 200 can be used to track the incoming optical signal 110, and thereby track the location of the transmitter 300 as it moves. In certain examples, the etalon 200 is configured to exhibit symmetric phase change in the output optical signal 112 at normal incidence of the input optical signal 110. Thus, by adjusting the etalon 200 such that the difference between a +Pi and a −Pi phase change is maximized, it can be ensured that the input optical signal is arriving normal to the surface 212 of the etalon 200. The orientation of the etalon 200 in turn allows the directional cosine vectors, in the direction of the tracked transmitter 300 to be determined. This provides a bearing to the tracked transmitter 300. In certain examples, timing information can be embedded in the input optical signal 110, such that the range, bearing, position, velocity, and acceleration of the transmitter 300 can all be estimated.

Referring again to FIG. 1, according to certain embodiments, the optical resonator assembly 120 may include a steering mechanism 150 coupled to the etalon(s) 200. The steering mechanism 150 can be used to adjust the orientation of the etalon 200 so as to maintain the symmetric phase change condition, thereby maintaining the arriving optical signal 110 at normal incidence. The steering mechanism 150 may be a piezoelectric device, for example, or other type of actuator that can change the orientation of the etalon 200.

Figure 4:
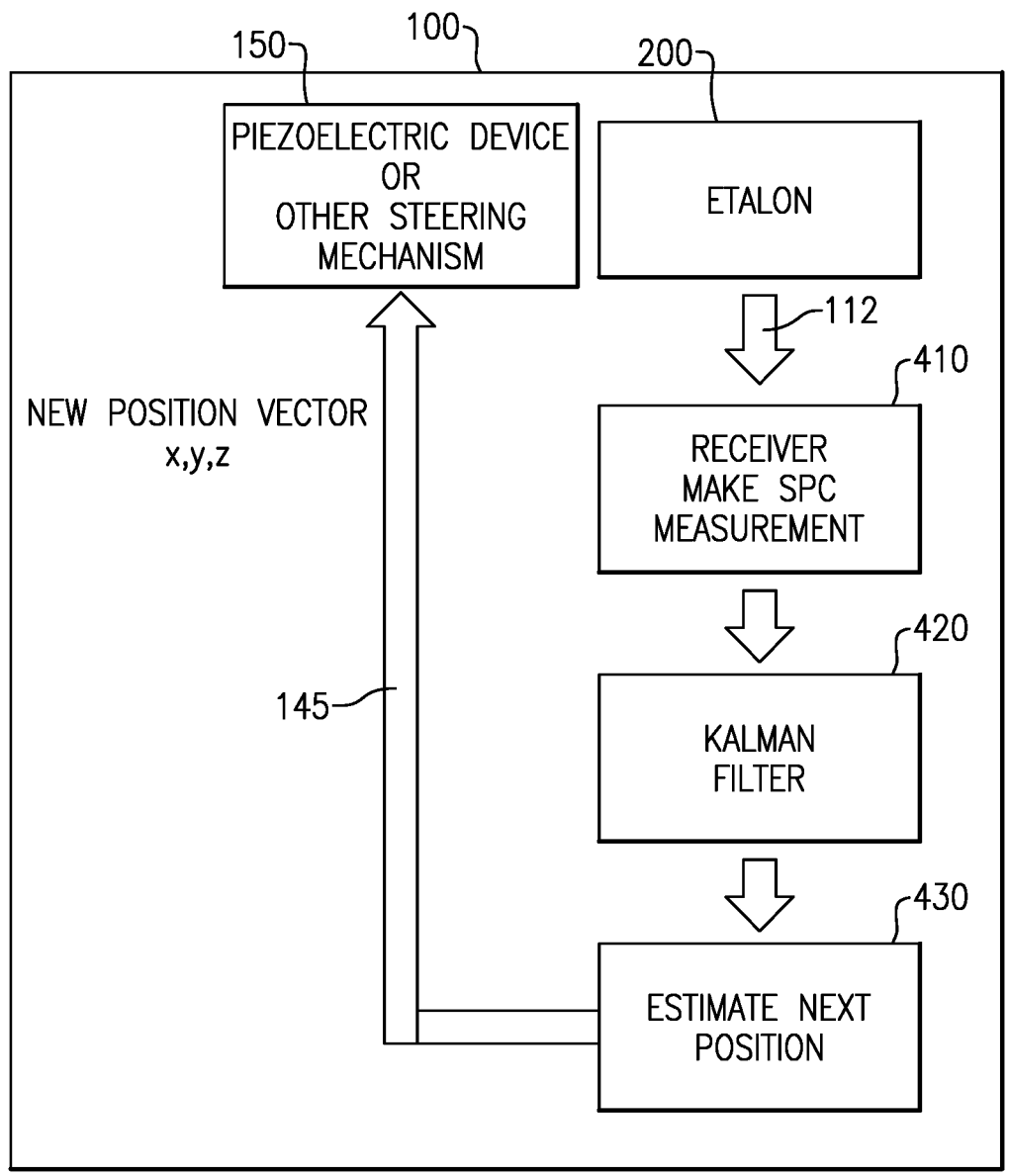
FIG. 4 is a functional block diagram of one example of components of an optical receiver according to aspects of the present invention.

FIG. 4 is a functional block diagram illustrating components of an example of the optical receive 100 configured to monitor the output optical signal 112 from the etalon 200 and adjust the orientation of the etalon so as to track the transmitter 300. As discussed above, the output optical signal 112 from the etalon 200 is converted from an optical signal into the electrical signal 114 by the OEC 130, which is part of receiver circuitry illustrated generally in FIG. 4 as receiver component 410. The receiver component 410 may further include circuitry configured to measure the difference in magnitude in the electrical signal 114 between +Pi and −Pi phase rotations in the input optical signal 110, thereby detecting whether or not the etalon 200 is operating with the symmetric phase change condition (indicated by a maximum difference in magnitude). The optical receiver 100 may include, for example, a Kalman filter 420 and position estimator 430, which may be part of the signal processing and control circuitry 140. The Kalman filter 420 may filter the measurements performed by the receiver component 410, and the position estimator 430 may provide an estimate for the next x, y, and z, position/orientation of the etalon 200 that will result in normal incidence of the arriving optical signal 110 at the etalon 200. A control signal 145 is applied to the steering mechanism 150 to control the steering mechanism to steer the etalon 200 to the new position. Thus, for an optical communications link involving a moving transmitter 300, the orientation of the etalon 200 can be maintained such that the incoming optical signal 110 is continuously normal to the etalon surface by detecting the occurrence of the symmetric phase change condition in the signal 112 output from the etalon.

The above process can be used to track the moving transmitter 300, or to maintain alignment between the transmitter 300 and the optical receiver 100 if the receiver is moving. In another example, the technique discussed above may also be used to estimate the location in space of a satellite or other moving transmitter 300. Direction cosine vectors can be computed from the position estimate vector output by the position estimator 430. By embedding a time-dependent coding signal, such as a direct sequence spread spectrum signal, in the optical transmission 110 from the transmitter 300, an estimate can be made of the distance between the optical receiver 100 and the transmitter 300. Knowing both the distance and the directional cosines, an estimate can be made of the location of the transmitter 300 and/or the optical receiver 100. In addition, if the transmission frequency, F0, is known and stable, the Doppler shift can be computed. Given known dimensions of the etalon 200 and known orientation of the etalon, the internal path length travelled by the incoming optical signal 110 can be computed to determine the Doppler shifted frequency. The difference between F0 and the resonant frequency of the etalon 20 is the Doppler shift frequency, from which the instantaneous velocity can be determined.

Thus, aspects and embodiments provide a method for tracking moving objects using an optical communications link. The symmetric phase change condition in the optical output signal from an etalon or other optical cavity resonator can be used to optimally orient the etalon for reception of an incoming optical signal. Those skilled in the art will appreciate, given the benefit of this disclosure, that while in examples discussed above the etalon 200 is tuned to exhibit the symmetric phase change condition for normal incidence of the arriving optical signal 110, another angle of incidence may be chosen. Further, a variety of different operating points of the etalon 200 may be selected, provided that a difference between positive and negative phase rotations can be reliably determined and used to produce a control signal to adjust the orientation of the etalon 200. As discussed above, orientation of the etalon 200 can be dynamically adjusted using a piezoelectric or other steering mechanism 150 controlled using symmetric phase change measurements. In certain examples, direction cosines of the vector normal (vector between the etalon 200 and the tracked object) can be determined from the orientation of the etalon 200, and these direction cosines can be used to determine a bearing to the object. Thus, the above-discussed technique can provide a method for determining the bearing to a moving object. In addition, as discussed above, if the arriving optical signal 110 contains timing information, then the position, velocity and acceleration of the transmitting object being tracked can be determined using both the directional cosine vectors and the timing information. The techniques may be applied to input optical signals 110 having all phase modulation schemes.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical receiver comprising:
    an optical resonator assembly including at least one optical resonator and a steering mechanism coupled to the at least one optical resonator, the at least one optical resonator being configured to receive a phase modulated input optical signal, to accumulate optical signal energy inside the at least one optical resonator based at least in part on the phase modulated input optical signal, and to produce an intensity modulated output optical signal, an intensity modulation of the output optical signal being representative of the phase modulation of the input optical signal, the at least one optical resonator being tuned to exhibit a symmetric phase change condition in the output optical signal at normal incidence of the phase modulated input optical signal on a surface of the at least one optical resonator;
    an optical-electrical converter configured to detect the intensity modulated output optical signal and to convert the intensity modulated output optical signal into an electrical signal; and
    signal processing and control circuitry coupled to the optical resonator assembly and to the optical-electrical converter, the signal processing and control circuitry being configured to receive the electrical signal, to perform symmetric phase change measurements based on the electrical signal, and to provide a control signal based on the symmetric phase change measurements to actuate the steering mechanism to steer the at least one optical resonator to maintain normal incidence of the phase modulated input optical signal on the surface of the at least one optical resonator.

2. The optical receiver of claim 1 wherein the at least one optical resonator is a Fabry-Perot etalon.

3. The optical receiver of claim 1 wherein the at least one optical resonator includes:

a first semi-reflective surface positioned to receive the phase modulated input optical signal; and a second semi-reflective surface positioned facing the first semi-reflective surface, wherein the at least one optical resonator is configured to accumulate the optical signal energy inside the at least one optical resonator and between the first semi-reflective surface and the second semi-reflective surface to approach a steady-state output value of the output optical signal, the intensity modulation of the output optical signal including a series of deviations from the steady-state output value.

4. The optical receiver of claim 1 wherein, in performing the symmetric phase change measurements, the signal processing and control circuitry is configured to compare a first amplitude of the intensity modulated output optical signal in response to a positive phase rotation in the phase modulated input optical signal to a second amplitude of the intensity modulated output optical signal in response to a negative phase rotation of a same magnitude in the phase modulated input optical signal.

5. The optical receiver of claim 4 wherein the signal processing and control circuitry includes a Kalman filter configured to filter the symmetric phase change measurements.

6. The optical receiver of claim 5 wherein the signal processing and control circuitry includes a position estimator configured to, based on the symmetric phase change measurements, to produce an estimate of an orientation, in x, y, and z coordinates, of the at least one optical resonator to maintain normal incidence of the phase modulated input optical signal on the surface of at least one optical resonator, the control signal being based on the estimate of the orientation.

7. The optical receiver of claim 6 wherein the signal processing and control circuitry is further configured to compute directional cosine vectors in a direction of a source of the phase modulated input optical signal based on the orientation of the at least one optical resonator.

8. The optical receiver of claim 1 wherein the steering mechanism is a piezoelectric device.

9. A method of tracking a moving transmitter using an optical receiver, the method comprising:
receiving a phase modulated input optical signal from the transmitter at an optical resonator included in the optical receiver;
tuning the optical resonator such that at a normal incidence of the phase modulated input optical signal on a surface of the optical resonator, the magnitude of symmetric positive and negative phase change is the same;
emitting an intensity modulated output optical signal from the optical resonator, an intensity modulation of the intensity modulated output optical signal being representative of a phase modulation of the phase modulated input optical signal;
converting the intensity modulated output optical signal into an electrical signal;
measuring, from the electrical signal, a response of the optical resonator to positive and negative phase rotations of equal magnitude in the phase modulated input optical signal; and
based on the measured response, steering an orientation of the optical resonator to maintain the normal incidence of the phase modulated input optical signal on the surface of the optical resonator.

10. The method of claim 9 wherein measuring the response of the optical resonator includes measuring an amplitude of the intensity modulated output optical signal in response to +Pi and −Pi phase rotations in the phase modulated input optical signal.

11. The method of claim 9 further comprising filtering measurements of the response of the optical resonator using a Kalman filter to produce filtered measurements.

12. The method of claim 11 further comprising, based on the filtered measurements, computing an estimate of the orientation of the optical resonator needed to maintain the normal incidence of the phase modulated input optical signal, and wherein steering the orientation of the optical resonator is based on the estimate.

13. The method of claim 12 wherein steering the orientation of the optical resonator includes actuating a piezoelectric steering mechanism coupled to the optical resonator.

14. The method of claim 9 further comprising:
based on the orientation of the optical resonator, computing directional cosine vectors in a direction of the transmitter; and
determining a bearing to the transmitter from the optical receiver based on the directional cosine vectors.

15. The method of claim 14 wherein the phase modulated input optical signal includes a time-dependent coding signal, and further comprising estimating a distance between the optical receiver and the transmitter based on the time-dependent coding signal.

16. The method of claim 15, further comprising estimating a location of the transmitter based on the directional cosine vectors and the estimated distance between the optical receiver and the transmitter.

17. A method of tracking a moving transmitter using an optical receiver, the method comprising:
receiving a phase modulated input optical signal from the transmitter at an optical resonator included in the optical receiver, the phase modulated input optical signal including a time-dependent coding signal;
emitting an intensity modulated output optical signal from the optical resonator, an intensity modulation of the intensity modulated output optical signal being representative of a phase modulation of the phase modulated input optical signal;
converting the intensity modulated output optical signal into an electrical signal;
measuring, from the electrical signal, a response of the optical resonator to positive and negative phase rotations of equal magnitude in the phase modulated input optical signal;
based on the measured response, steering an orientation of the optical resonator to maintain normal incidence of the phase modulated input optical signal on a surface of the optical resonator;
based on the orientation of the optical resonator, computing directional cosine vectors in a direction of the transmitter;
determining a bearing to the transmitter from the optical receiver based on the directional cosine vectors;
estimating a distance between the optical receiver and the transmitter based on the time-dependent coding signal; and
determining a Doppler shift of the phase modulated input optical signal received at the optical resonator based on a frequency of the phase modulated input optical signal, the orientation of the optical resonator, and a thickness of the optical resonator.

18. The method of claim 17, further comprising determining an instantaneous velocity of the transmitter based on the Doppler shift.

\* \* \* \* \*